Oct. 17, 1939.  R. I. BLAKESLEE  2,176,484
INCUBATOR
Filed Dec. 6, 1935  2 Sheets-Sheet 1
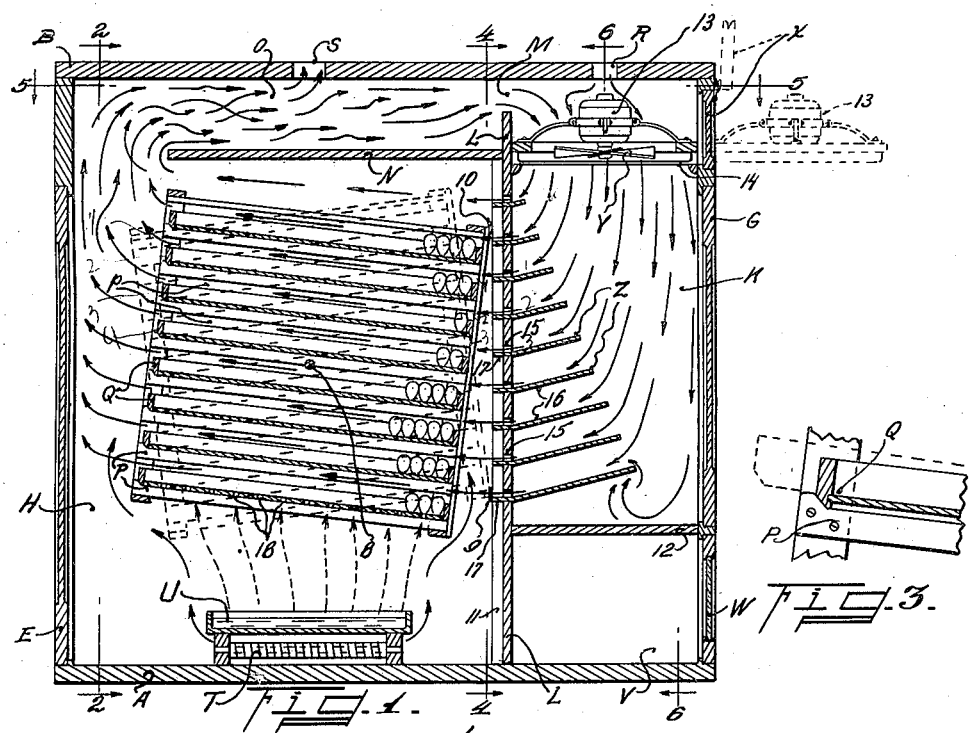
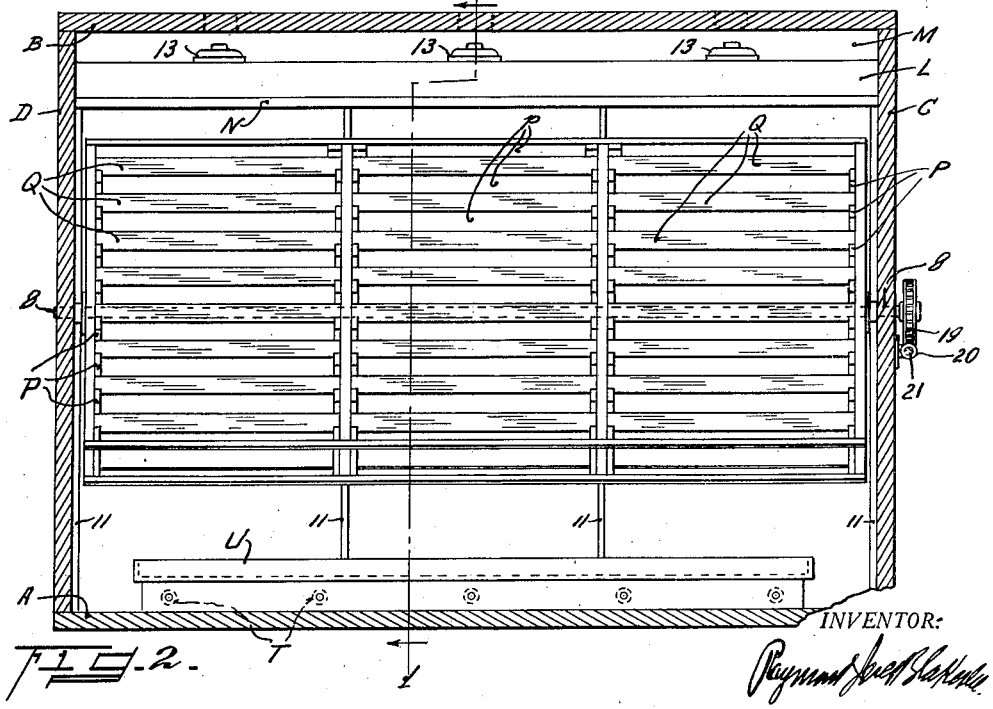
INVENTOR:
Raymond Joel Blakeslee

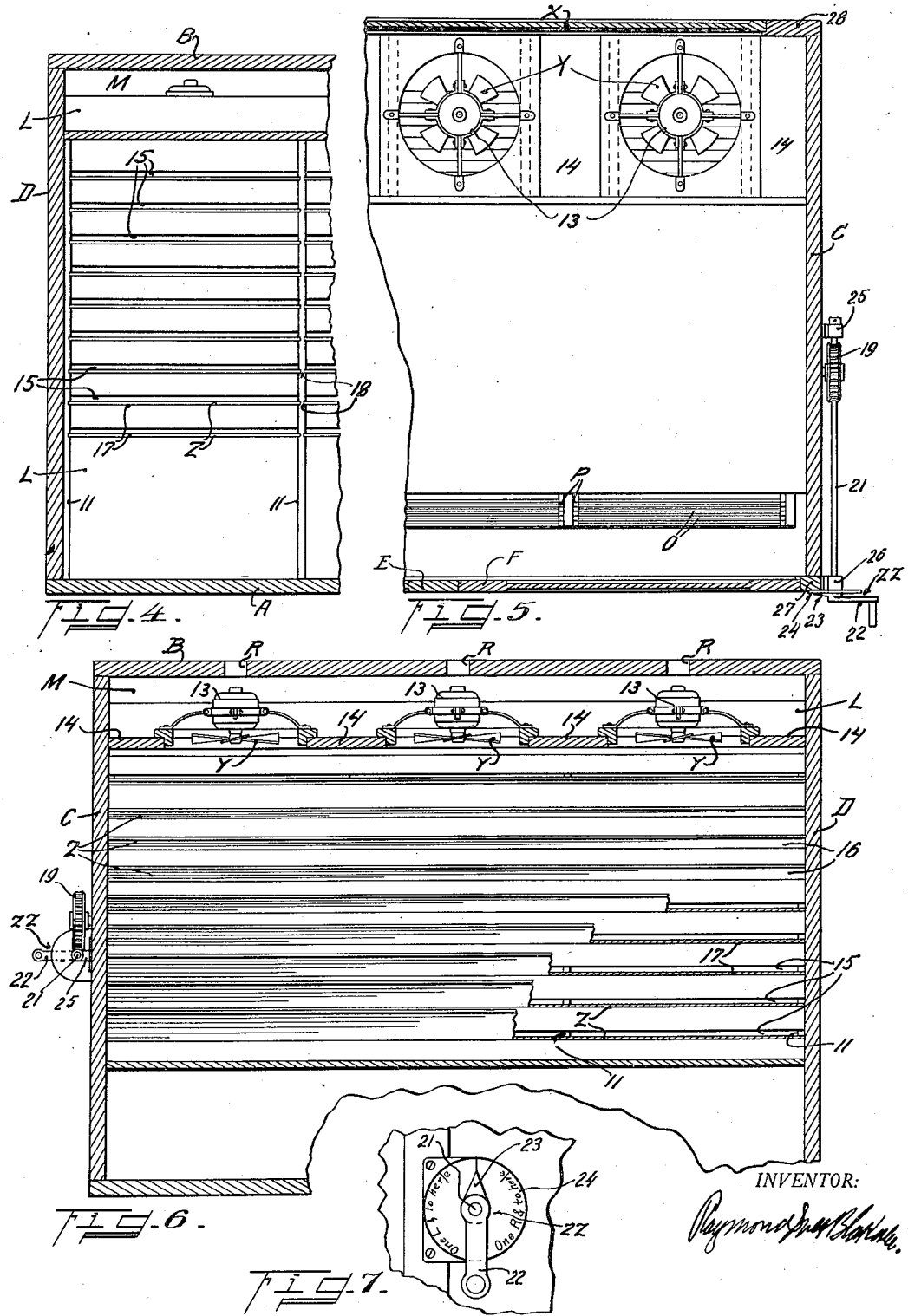

Patented Oct. 17, 1939

2,176,484

UNITED STATES PATENT OFFICE 2,176,484

INCUBATOR

Raymond Ives Blakeslee, Alhambra, Calif.

Application December 6, 1935, Serial No. 53,195

5 Claims. (Cl. 119—37)

This invention relates to incubators, and more particularly to mammoth incubators of the type in which a large number of eggs are incubated simultaneously in a given cabinet or chamber and subjected to the movement of air therein for the purposes of modifying temperature of endothermic eggs in the earlier stages of incubation and exothermic eggs in the later stages of incubation, and to thereby set up favorable incubating conditions.

In accordance with the present invention, air is forced to pursue a selected course or selected courses or a selected path or selected paths, and so controlled and subjected to such behavior that the proper equalization of egg temperature takes place. Suitable means are provided for supplying additional heat units and humidity, and also for supplying a small amount of fresh air and discharging or exciting a small amount of foul air, all for the purposes and in accordance with the purposes of modern incubation. While complete treatment of the eggs may take place in apparatus constructed in accordance with this invention, it may be preferable to only carry on the incubation therein, as distinguished from hatching, and to carry on the hatching in a separate cabinet or chamber, so that the filth, germs, broken egg shells, down and other objectionable phenomena and by-products of hatching are not present in the incubation chamber.

The invention consists in the novel and useful provision, formation, construction, combination, interrelation and association of parts, members and features, and steps and procedure or performance, all as hereinafter described, shown in the drawings and finally pointed out in claims;

And the invention has for its object the provision of a new and useful incubator which will be superior with respect to relative simplicity and inexpensiveness of construction, facility of operation and use and control, durability, and increased efficiency, and which will be generally superior in economy and effectiveness. The invention also relates to a novel and improved method of incubation which may be carried on or performed in the use of the incubator disclosed herein.

Other objects will appear in the course of the ensuing description.

I have illustrated one embodiment or practice of my invention in the accompanying drawings, in which:

Fig. 1 is a vertical transverse section, or front to rear section, of an incubator embodying the invention, taken upon the section line 1—1 Fig. 2 looking as arrows indicate;

Fig. 2 is a longitudinal or end to end vertical section taken upon the line 2—2, Fig. 1, and looking in the direction of the appended arrows;

Fig. 3 is an enlarged detailed fragmentary sectional view of features of the structure, shown likewise in section in Fig. 1, pertinent to the support of the egg trays in the egg racks, a portion of one of the trays being shown in dotted lines in position for placing in or removing from the racks;

Fig. 4 is a fragmentary vertical longitudinal sectional view taken upon the line 4—4, Fig. 1, and looking in the direction of the appended arrows;

Fig. 5 is a horizontal and fragmentary transverse sectional view taken upon the line 5—5, Fig. 1, and looking in the direction of the appended arrows;

Fig. 6 is a vertical transverse sectional view, with parts broken away, taken upon line 6—6, Fig. 1, and looking in the direction of the appended arrows.

Fig. 7 is an enlarged front elevation of the control portion of tilting means for egg racks with dial and pointer for indicating degree of tilt, with fragmentary associated parts.

Corresponding parts in all the figures are designated by similar reference characters.

Referring with particularity to the drawings, I have shown at A the base or floor member, at B the top or roof member, at C and D the end members, at E and F the front doors, and at G the rear door or doors of a casing or cabinet normally closed, and provided with an incubating chamber H and air pressure chamber K, which are partially separated from each other by a partition L extending lengthwise of the cabinet and from the floor thereof upwardly to terminate somewhat below the roof B, providing a longitudinally extending relatively restricted elongated air port, M, extending lengthwise of the cabinet. Forwardly from this partition L there is preferably provided a horizontal partition N ranging lengthwise of the cabinet from end wall C to end wall D, and springing from the upright partition L at a zone somewhat below the top thereof, and ranging forwardly of the cabinet above the incubating chamber H which it separates from an air mixing chamber O extending between such partition N and the top member B of the cabinet, from one end of the cabinet to the other, and communicating forwardly with the incubating chamber and rearwardly with the air passage M. Within the air incubating chamber H is disclosed a series of egg racks grouped together and ranging forwardly and rearwardly of the incubating chamber, and also lengthwise thereof, beneath the partition N, and mounted to tilt forwardly and rearwardly upon a shaft 8 journalled in the end walls C and D, so that the group of egg racks P may be tilted forwardly and rearwardly for a few degrees of angularity as limited by lower and upper stop bumpers 9 and 10 disposed forwardly of the partition L upon vertical frame members 11, the office of which is described further on. The racks, being a tilting drum in assembly, are disposed when in vertical position almost entirely within the incubator chamber space beneath the partition N, or substantially or to a major extent filling the incubator chamber H. Egg trays Q are disposed within or upon these racks as hereinafter described. Relatively small air inlet openings R are provided above the air pressure chamber K in a series lengthwise of the cabinet and similarly relatively small air outlet openings or vents S are provided in a series lengthwise of the cabinet above the air chamber O. These openings are provided in the roof of the cabinet. Artificial heating means T and artificial humidifying means U are provided within the incubator chamber, and shown disposed at the bottom thereof, the latter above the former, and extending lengthwise of the incubator chamber. The air pressure chamber K ranges lengthwise of the cabinet below the top of the partition L downwardly to a base wall 12 leaving a closed compartment or space V between such base member, the lower portion of the partition L, the floor A of the cabinet and a door or doors W permitting access, and which chamber or space V may be used for brooder purpose or otherwise, the same being heated through the partition and base member by conduction of heat units from the incubating chamber and air pressure chamber. In addition to the door or doors G, the door or doors X may be provided for the upper portion of the air pressure chamber K and the space where such chamber merges with the air port M at the top of the cabinet. These doors X may provide access to this latter space wherein may be mounted one or more power blowers or fans 13 constituting means Y other than convection currents in the chamber H for imparting motion to the air received at the top of the air pressure chamber, through the air port M, with the increment of fresh air entering through the ports R. These blowers or fans are preferably of relatively high speed type with relatively short blades formed to drive the air downwardly within the pressure chamber, and they are all mounted slidably upon transverse space panels 14 spanning the upper portion of the air pressure chamber, whereby the fans may be moved forwardly or rearwardly of the air chamber either into or out of the latter when the doors X are open, as indicated in Fig. 1, by swinging such door or doors upwardly. The fans are thus disposed in a series lengthwise of the cabinet and take in the air from above and laterally and force it downwardly, compressing the air within the chamber K to an extent, possibly a small fraction of an atmosphere, such compression being incident to and entering into the expulsion of such air forwardly through longitudinally elongated air discharge ports 15 in the partition L, arranged in a vertical series and spaced apart, as clearly shown in Figs. 1, 4 and 6, whereby the air proceeds initially in flat and jet form to the egg tray racks P and egg trays Q supported therein, and particularly and largely that air thus directed traverses the interspaces or open longitudinal and transverse passages p between each egg tray and the egg tray above it. The egg tray racks or drums are preferably so limited in tilting by the stop strips 9 and 10 that whether tilted to either angularity permitted by such stop strips, the interspaces p will register with the respective discharge slots 15 so that the air will enter such interspaces and pass between each tray and its adjacent lower egg tray and lave and involve in its passage the eggs in the respective rack. This gives a predetermined and definite direction of moving air between the several egg trays, and even if the interspaces p are not directly in registration with the ports 15, the air will spread and pass into such interspaces, it being an important feature of the present invention that the air, proceeding directly from the source of pressure or supply, passes practically immediately into and through such interspaces, tending to bring about the equalizing of the temperature of the air so traversing such interspace and the eggs which it contacts. Younger eggs will tend consequently to have their temperature slightly raised and older eggs will tend correspondingly to have their temperature slightly lowered, and the air, so passing as indicated by the arrows, and entering, as indicated by the arrows, exits from said interspaces p as indicated by further arrows, some of it cooler and some of it warmer than the adjacent layers of air, and all said layers then, not finding space for expansion or exit in the lower or front portion of the cabinet, are directed upwardly by the opposition of the front doors E and F, and, aided by the slightly lowered pressure above the fans 13, commingle in a turbulence produced by the relative contraction of cross-sectional area of the air conduit O, so that the temperature becomes practically constant throughout the moving air mass, such commingled air layers then passing through the air port M, receiving a slight pick-up of fresh air through the inlet openings R, and being further mixed and thrust downwardly into the air pressure chamber K, all as indicated by the further series of arrows. To direct the slightly compressed and moving air from the air chamber through the discharge ports 15 a plurality of deflectors and spreaders Z are provided which are clearly displayed in Figs. 1, 4 and 6, and which range lengthwise of the cabinet and likewise forwardly and rearwardly thereof. These spreaders have slightly upwardly inclined portions 16 within the air pressure chamber, and horizontal portions 17 projecting through the lower portions of the discharge ports 15 and slightly forwardly thereof, so that the air forced downwardly within the pressure chamber engages with such spreaders and deflectors and is spread over the upper surfaces thereof, meanwhile being directed forwardly and through the ports 15 and jetted into the interspaces p between the egg trays. If some air strikes the trays or racks, it deflects and enters the interspaces with the rest of the jets whose action induces such merger. These deflectors and spreaders Z preferably project rearwardly within the air pressure chamber K and from top to bottom of said chamber progressively increase in length whereby each port 15 is assured an ample quantity of moving air for discharge into the incubating chamber H. Of course, such discharge is likewise aided by the slight building up of pressure within the chamber K, but the members Z being disposed directly in the path of the descending air mass, assure a definite and concentrated conduct of air to the discharge ports 15. Further mixing of the air likewise takes place within this air pressure chamber so that with the mixing in the chamber O, the mixing which is produced by the action of the fans and the mixing within the air pressure chamber due to the whirling in the air chamber, all of the air emitted through the ports 15 is of practically constant and even temperature, so that an abstraction of heat units from the older eggs and an addition of heat units to the younger eggs most effectively takes place and incubation is promoted and "cooking" or over-heating of the eggs prevented. The convection currents rising from the heating means T pick up the vapors from the humidifying means U and carry same up in the direction of the dotted arrows indicated in the bottom of the incubating cabinet in Fig. 1, so that same may, if desired, pass through perforations 18 which may be provided in the bottoms of the egg trays, or wire mesh bottoms may be used. All of the trays may be so provided so that there may be a tendency of this moistened ascending air to pass on upwardly through at least one or two of the trays and perhaps more, until it is whipped away by the air passing through the interspaces p and intermixed therewith. Some of the heat may pass upwardly as shown by the curved arrows at the bottom of the incubating chamber, and pick up moisture and ascend into position to be intercepted by and intermingled with the air passing through the interspaces p. In either case, the air layers become slightly artificially heated and moistened, making up for the losses of heat and moisture through the air outlet vents S, and amounts imparted to and taken up by the eggs. Such heat and moisture units are thoroughly commingled with the air as it is commingled in the air chamber O and air pressure chamber K and by the action of the fans. Foul gas is given off and oxygen taken in by the eggs.

The integrity of the partition L is maintained by the vertical strips 11 or frame members heretofore referred to, the same tying together the partition members separated by the ports 15, and the forwardly projecting portions 17 of the members Z are interfitted with such members 11 as clearly shown at 18 in Fig. 4.

The shaft 8 of the drum comprising the egg tray racks is provided exteriorly of the cabinet with a wormgear 19 meshing with a worm 20 upon a shaft 21 which may be provided at its forward end with a crank or handle member 22 and a fixed pointer 23 playing over a dial 24 to indicate at opposite paths of play the tilting of the egg rack drum into its extreme positions, so that this indication may be relied upon if the stop bumpers 9 and 10 are not present or relied upon. Such operating and indicating means ZZ serve to control the tilt of the drum and indicate its tilt into the proper positions for best registration with the discharge air ports 15. The shaft 21 is journalled in end bearings 25 and 26 mounted upon the cabinet walls. Of course, there are narrow front wall elements as illustrated at one side at 27 for cooperating with the doors E and F, and similar rear wall elements as at 28.

In operation, the air, with small increments of air to be newly circulated, taken in through the inlet ports R, is positively and forcibly driven downwardly within the air pressure chamber K, maintaining a slight pressure therein, if desired, which promotes or contributes to the active and positive and forceful emission of air through the discharge ports 15 in the partition L. This plurality of jets of air is directed almost immediately upon the closely disposed drum of egg racks P and egg trays Q of the tilting drum structure. If this drum structure is tilted in either extreme position illustrated in Fig. 1, the air jets will pass directly into the interspaces between the trays and racks; and if the drum be in any other angularity intermediate of these extreme tilts, or in horizontal position, still the air jets will spread about any opposing surface and thereupon immediately enter the said interspaces. As there is a port 15 for each interspace, it is made certain that all of the trays of eggs will be served with positively moving air traversing definite paths, and, of course, the speed of the movement of this air may be regulated as desired by varying the speed of rotation of the blades of the fans 13. The speed of air movement will, of course, be regulated to best impart heat units to the eggs and remove heat units therefrom, depending upon the relative temperatures of any particular tray of eggs and the layer or current of air laving the same. The air then proceeds forwardly and upwardly, after leaving the egg drum, and passes into the air mixing chamber O and thence through the elongated air port M, during all of which traverse from the drum the various air layers exiting from the drum are thoroughly mixed together, as they are further thoroughly mixed by the fans 13 and also within the air pressure chamber K. The result of this is that the air emitted by the discharge ports 15 is of a substantially constant temperature, or even temperature, which will be lower than that of the older eggs and higher than that of the younger eggs. If, as in other forms of incubators, air is passed through trays having perforated or foraminous bottoms either upwardly or downwardly, it is bound to be successively modified in temperature by the eggs in successive trays of different ages and finally by the last tray whose eggs it contacts; and this temperature may not and probably will not have at all a median or average temperature intermediate of that of the warmest eggs and the coolest eggs. So, likewise, if the air be passed, by mass movement, between the trays without definite direction to the interspaces between the trays, or after extended air movement, and then passes on to the air mover or fan, an even distribution of the air between the trays cannot occur, and some interspaces may receive little or no moving air, especially when the air passes from the trays immediately to the fans or fan eyes; and furthermore, unless a thorough mixing takes place after the air has left the eggs, no air stream of median temperature can be provided for re-application to the eggs, either with or without fresh increments of heat and moisture and air. By arranging the ports 15 and the interspaces between the trays relatively, as in accordance with the present invention, and providing at all times a proximate source of air under pressure as from the pressure chamber K, even distribution of air and a median temperature is assured and the eggs are given just the right treatment of moving air to cool the warmer eggs and warm the cooler eggs and thus prevent "cooking" of the hotter eggs or failure of the cooler eggs to properly incubate. This the present invention accomplishes by the coordination of its several elements and features, to a large degree of efficiency. Small amounts of foul air produced in the incubation of the eggs, which emit foul gas and take in fresh oxygen, are emitted through the air openings S.

The definite and positive and certain direction of the moving medium-temperatured air to and between the egg trays from the closely disposed air ports 15, assures the application of practically all the moving air to all the eggs and a consequent high efficiency of incubation flowing from optimum endothermic and exothermic interrelation.

As before stated, the eggs may be allowed to remain in the egg rack and tray drum the full period of twenty-one days of gestation, so that the chicks hatch out within the incubating chamber H. However, the present apparatus operates to greater satisfaction in connection with any desirable hatching cabinet to which the egg trays are moved after eighteen days of treatment in the incubating chamber H, and such separate hatching cabinet may be organized in accordance with the present invention or in accordance with other well known practices of that sort.

The trays of eggs placed within the incubating chamber H may be arranged so that the oldest and hottest eggs may be next adjacent youngest and coolest eggs, or they may be arranged with respect to age in any desired order or without any desired order, in the latter case indiscriminately and without any reference to age or heat. In any case, they will be effectively subjected to air currents of median temperature to produce the highest efficiency of performance with respect to the exothermic and endothermic egg factors and the fullest conservation of eggs capable of hatching out, and resultant best percentage of hatches.

Having described my invention in connection with illustrative embodiments, forms, proportions and arrangements of parts, it will be understood that many variants thereof are possible to those skilled in the art, and my invention, in its broader aspects, is not limited to the specific construction herein described and shown, as changes in in the sizes, proportions, configurations, arrangements, assemblage, interaction, juxtaposition and mechanical relations, as well as additions, omissions, substitutions, combinations and alterations of forms, parts, members and features, and sequence or specific nature of steps or performance, may be made without departing from the broad spirit of this invention.

Having thus disclosed my invention, I claim and desire to secure by Letters Patent:

1. An incubator comprising a casing, a partition within said casing dividing the same into an incubating chamber and an air pressure chamber, another partition cooperating with said first mentioned partition and a wall of said casing to provide an air mixing chamber communicating at one end with the incubating chamber and at its other end with said air pressure chamber, means for producing a flow of air from said mixing chamber into said pressure chamber, and a series of egg trays in said incubating chamber tiltably mounted and having air spaces therebetween, the first mentioned partition having a series of openings therein so spaced that when the egg trays are tilted in either direction to a predetermined limit a plurality of said openings are substantially alined with the air spaces between the egg trays, respectively.

2. An incubator comprising a casing, a substantially vertical partition within said casing dividing the same into an incubating chamber and an air pressure chamber, said chambers being closed relative to each other at their lower ends and being in communication with each other at their upper ends, means for producing a flow of air from said incubating chamber into said pressure chamber, and a series of egg trays in said incubating chamber having air spaces therebetween, said egg trays being mounted for tilting movements between predetermined limits, said partition having a series of openings therein disposed relative to each other and to said egg trays so that a plurality of said openings substantially aline with a plurality of the spaces between said egg trays when said egg trays are at their limits of tilting movement in either direction for flow of air from said air pressure chamber into said incubating chamber and through the air spaces between said egg trays.

3. An incubator comprising a casing, a vertical partition within said casing dividing the same into an incubating chamber and an air pressure chamber, the top of said partition being disposed below the top of the casing to provide for flow of air from the incubating chamber to the air pressure chamber, a horizontal partition extending from said vertical partition in spaced relationship to the top of the casing providing an air mixing chamber communicating at one end with said incubating chamber and at its other end with said air pressure chamber, means at the top of said pressure chamber and in vertical alignment therewith for producing a flow of air from said incubating chamber through said air mixing chamber into said pressure chamber, the top of the casing having a fresh air inlet opening directly above said air flow producing means and also having a foul air outlet opening above said mixing chamber, a series of egg trays mounted in said incubating chamber for tilting movement in opposite directions between predetermined limits and having air spaces therebetween, said vertical partition having a series of openings disposed to aline with a plurality of said spaces, respectively, for flow of air from said air pressure chamber to the incubating chamber through said spaces when said egg trays are at their limit of tilting movement in either direction, and means to direct air in substantially equal amounts from the air pressure chamber through said openings.

4. An incubator comprising a casing, a substantially vertical partition within said casing dividing the same into an incubating chamber and an air pressure chamber, said chambers being closed relative to each other at their lower ends and being in communication with each other at their upper ends, means for producing a flow of air from said incubating chamber into said pressure chamber, and a series of egg trays mounted for limited tilting movement in said incubating chamber and having air spaces therebetween, said partition having a series of openings therein and deflectors of varying superficial dimensions adjacent thereto and extending into the air pressure chamber, said openings being spaced relative to each other and to said egg trays so that said openings register with different of the spaces between said egg trays in different tilted positions of the egg trays for flow of air from said air pressure chamber into said incubating chamber and through said air spaces between said egg trays.

5. An incubator comprising a casing, a substantially vertical partition within said casing dividing the same into an incubating chamber and an air pressure chamber, said chambers being in communication with each other adjacent one end and being closed relative to each other at their other ends, air moving means in the pressure chamber adjacent the point of communication between the incubating chamber and the pressure chamber for inducing a flow of air from said incubating chamber into said pressure chamber, and a series of egg trays tiltably mounted in said incubating chamber and having air spaces therebetween, said partition having a series of openings therein so spaced that when the egg trays are tilted in either direction to a predetermined limit a plurality of said openings are substantially alined with a plurality of the air spaces between the egg trays respectively.

RAYMOND IVES BLAKESLEE.